United States Patent [19]

Ohwaki et al.

[11] Patent Number: 4,948,760
[45] Date of Patent: Aug. 14, 1990

[54] WATER REPELLANT INORGANIC GLASS

[75] Inventors: Takeshi Ohwaki; Yasunori Taga, both of Nagoya, Japan

[73] Assignee: Kabushiki Kaisha Toyota Chuo Kenkyusho, Aichi, Japan

[21] Appl. No.: 403,052

[22] Filed: Sep. 1, 1989

Related U.S. Application Data

[63] Continuation of Ser. No. 114,017, Oct. 29, 1987, abandoned.

[30] Foreign Application Priority Data

Nov. 1, 1986 [JP] Japan ................. 61-259620
Nov. 27, 1986 [JP] Japan ................. 61-280684

[51] Int. Cl.$^5$ ................. C03C 3/06; C03C 15/00
[52] U.S. Cl. ................. 501/54; 501/56; 501/57; 501/59; 501/65; 501/72; 65/30.1; 65/30.13; 65/30.14
[58] Field of Search ................. 65/30.1, 30.13, 30.14; 501/54, 56, 57, 59, 65, 72

[56] References Cited

FOREIGN PATENT DOCUMENTS

| | | | |
|---|---|---|---|
| 0153677 | 1/1982 | Fed. Rep. of Germany | 65/30.13 |
| 0206140 | 1/1984 | Fed. Rep. of Germany | 65/30.13 |
| 0214369 | 10/1984 | Fed. Rep. of Germany | 65/30.13 |
| 57-011850 | 1/1982 | Japan | 65/30.13 |
| 57-011851 | 1/1982 | Japan | 65/30.13 |

*Primary Examiner*—Mark L. Bell
*Assistant Examiner*—Anthony J. Green
*Attorney, Agent, or Firm*—Burns, Doane, Swecker & Mathis

[57] ABSTRACT

An inorganic glass having high water repellence produced by irradiating and/or implanting ions upon or into a surface of the inorganic glass, the ions are those of at least one element selected from the group consisting of (a) halogen elements selected from F, Cl, and Br, group 3A, 3B, 4A and 5B elements of the International Periodic Table selected from Al, Ti, Y, In and Bi, (b) rare gas elements selected from He, Ne, Ar, Kr and Xe, group 3A, 4A, 1B, 2B, 3B, 4B and 5B elements of the International Periodic Table selected from Sc, Cu, Zn, Ag, Cd, Sn, Sb, Au, Hg, Tl and Pb, alkali metal or alkaline earth metal elements selected from Li, Na, K, Rb, Cs, Be, Mg, Ca, Sr and Ba, and (c) Ce, the dose of th (a), (b) and (c) ions being $5 \times 10^{14}$ to $1 \times 10^{20}$ ion/cm$^2$, $5 \times 10^{14}$ to $1 \times 10^{17}$ ion/cm$^2$ and $1 \times 10^{17}$ to $1 \times 10^{20}$ ion/cm$^2$, respectively.

6 Claims, 1 Drawing Sheet

WATER REPELLANT INORGANIC GLASS

This application is a continuation, of application Ser. No. 114,017, filed Oct. 29, 1987, now abandoned.

BACKGROUND

The present invention relates to an inorganic glass which is provided with water repellence that is produced by ion irradiation upon or ion-implantation in the surface thereof.

When water sticks onto the surface of a glass window or a glass mirror of, for example, automotive vehicles, boats or buildings, visibility through the glass is obstructed.

Other than the mechanical wiping of the glass, the following three methods have been proposed to overcome the abovementioned problem:

(1) Water repellent treatment of the glass surface
(2) Hydrophile treatment of the glass surface
(3) Heating of the glass In principle, each of these treatments improves the surface energy of the glass.

As examples of the first method, the glass surface is covered with an organo-silicone (Japanese Patent Kokoku Publication No. 50-15473), or is ion-implanted by semiconductor elements such as B or Si, N or Group 8 elements (in the International Periodic Table) in accordance with an ion-implantation technique utilized for semiconductor impurity doping (Japanese Patent Kokai Publication Nos. 56-84344, 57-11850, 57-11851). Other examples include the coating of a water repelling agent of an organo-silicone type or a fluorine type on the surface of the glass by either application or spray coating as well as coating the glass with a polymer film of a fluorocarbon type or a fluorine type on the basis of a plasma treatment technique (Japanese Patent Kokoku Publication No. 60-13065).

Examples of the second method include the coating of the glass surface with a hydrophilic surface-active agent, polyhydric alcohol, or hydrophilic polymer (Japanese Patent Kokai Publication No. 53-58492). In this method, the field of vision can be secured by wetting the surface of the glass.

With respect to the third method, a heat generating element is bonded onto the surface of glass to evaporate water by heat.

However, the above-mentioned methods involve the following problems:

The third method has a large energy consumption and is also high in cost due to the complexity of the manufacturing steps associated therewith. Further, because this method is not effective for repellence of large-diameter drops of water, this method has only a limited use.

In the second method, the durability of the treated layer on the glass surface is poor, therefore this method cannot be effectively employed in automotive vehicles which require particularly severe weather proofing characteristics.

With respect to the first method, the method of coating glass with organic silicon also provides poor durability with regard to the water repellent effect. Further, the conventional ion implantation method using Ni, P or Si is not practical because the weatherproof characteristics and the durability are not satisfactory.

In summary, glass which has been treated for water repellent and hydrophile characteristics in accordance with the above-mentioned methods are only partially effective for mirrors within, for example, bathrooms. Furthermore, the durability of the water repellence of the glass surface is low when the treated glass is used under severe outdoor environmental conditions. In particular, the durability of water repellent effect of the prior-art method is not sufficient when used within vehicles, ships, aircraft, etc. where severe weatherproof characteristics and strong wear resistance are both required.

SUMMARY OF THE DISCLOSURE

A basic object of the present invention is to improve the above-mentioned prior-art drawbacks and to provide an inorganic glass that has good water repellent and severe weatherproof characteristics without increasing the cost of the glass. This can be accomplished by changing the nature of the surface of the glass.

Another object of the present invention is to provide a water repellent glass-provided with an excellent water repellence durability which is particularly important for glass used in vehicles.

Still further objects of the present invention will become apparent from the entire disclosure.

According to the present invention, there is provided an inorganic glass having high water repellence produced by irradiating and/or implanting ions upon or into a surface of said inorganic glass, said ions are those of at least one element selected from the group consisting of (a) halogen elements selected from F, Cl, and Br, group 3A, 3B, 4A and 5B elements of the International Periodic Table selected from Al, Ti, Y, In and Bi, (b) rare gas elements selected from He, Ne, Ar, Kr and Xe, group 3A, 4A, 1B, 2B, 3B, 4B and 5B elements of the International Periodic Table selected from Sc, Cu, Zn, Zr, Ag, Cd, Sn, Sb, Au, Hg, Tl and Pb, alkali metal or alkaline earth metal elements selected from Li, Na, K, Rb, Cs, Be, Mg, Ca, Sr and Ba, and (c) Ce the dose of said (a), (b) and (c) ions being $5 \times 10^{14}$ to $1 \times 10^{20}$ ion/cm$^2$, $5 \times 10^{14}$ to $1 \times 10^{17}$ ion/cm$^2$ and $1 \times 10^{17}$ to $1 \times 10^{20}$ ion/cm$^2$, respectively.

According to the present invention, a water repellent glass having a high durability and a low price can be obtained.

The energy required for ion irradiation and/or implantation is 50 to 400 keV. The upper limit of the energy range is not clearly limited but can also depend upon the manufacturing cost or the performance of the ion-implantation equipment.

As a result of our devoted study for solving the aforementioned problems involved in the prior-art glasses, the causes of the prior-art problems have been analyzed as follows: The coated film is peeled off little by little from the boundary between the film and the glass substrate during use because the coated film is not perfectly adhered onto the glass substrate. Therefore, in order to improve the durability of water repellent inorganic glass, it is very important to eliminate the interface which may be present between the glass substrate and the treatment layer. The present invention has been completed on the basis of this point.

Further, when the contact angle of water on the surface of glass lies from 10 to 50 degrees, a transitional state between hydrophile and repellent conditions exists. This causes poor visibility once water drops stick onto the surface of the glass. Therefore, to achieve the above-mentioned object, it is necessary to maintain the contact angle of water to glass (herein after referred to as "contact angle" or "water contact angle") of at least 70 (preferably up to 95 ). Further, other modifications of the preferred embodiments are defined in the appendant claims.

The function and effect of water repellent inorganic glass of the present invention whose surface layer is improved by ion irradiation and/or implantation in implanting ions on the surface of a glass substrate will be described herein below.

When drops of water stick onto the surface of an untreated glass substrate, the visibility is degraded. In the inorganic glasses of the present invention, however, since the surface energy is decreased in dependence upon appropriate ion irradiation and/or implantation when compared with water aggregation energy, water drops are ready to be aggregated, which results in good water repellent characteristics. In addition the water repellency is maintained even when the glass is used in an open air environment where the temperature can change rapidly. Further, in comparison with the prior-art glasses to which certain organo-silicone based water repelling agents were applied or a polymer film was coated, the inorganic glasses of the present invention have excellent durability. Moreover, the good water repellent effects can be semi-permanently maintained, because no clear interface exists between the glass substrate and the improved water repelling layer.

The method of manufacturing the glass of the present invention is simple, because ions are irradiated on and-/or implanted in a glass substrate in a single treatment step.

The water repellent inorganic glasses of the present invention can be employed as window glasses or mirrors for vehicles, ships or aircraft which require severe water repellence durability, while further improving the safety of the vehicles or aircraft. The glasses of the present invention are of course usable at every place and for every purpose where good water repellence is needed on glass.

DESCRIPTION OF THE PREFERRED EMBODIMENTS

Figure 1:
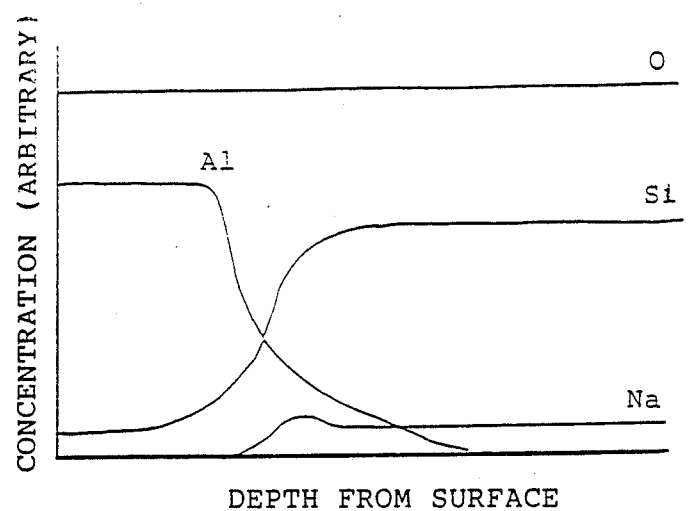
FIG. 1 is a composition distribution graph along the depth starting from the surface of soda lime glass in Example 6-1 of the present invention after Al ions have been implanted.

The inorganic glass of the present invention is provided with a water repellent surface formed by irradiating and/or implanting ions on or in the surface thereof through ion irradiation, and further the glass has water repellent characteristics which can be maintained under severe outdoor environmental conditions where severe weatherproofing characteristics are required.

The inorganic glass which can be used in the present invention comprises ordinary colorless, transparent glasses formed from inorganic oxides, for example, soda lime glasses, high silica glasses, borosilicate glasses, etc.

Ion-irradiation is performed within the dose range of $5 \times 10^{14}$ to $1 \times 10^{17}$ ion/cm$^2$. Ion-implantation is performed within the dose range of $1 \times 10^{17}$ to $1 \times 10^{20}$ ion/cm$^2$ In the vicinity of $1 \times 10^{17}$, the effects obtained from ion-irradiation and ion-implantation are present together.

The kind of ions irradiated on the glass is any one of or a combination of halogen elements of Class B (F, Cl, Br); rare gas elements of Class A (He, Ne, Ar, Kr, Xe); metallic elements of Class C (Al, Ti, Y, In, Bi, Sc, Cu, Zn, Zr, Ag, Cd, Sn, Sb, Au, Hg, Tl, Pb; and alkali metal or alkaline earth metal of Class D (Li, Na, K, Rb, Cs, Be, Mg, Ca, Sr, Ba).

When the elements are ionized so as to have energy of 50 to 400 KeV for ion-irradiation to the glass surface, the water repellence of glass surface layer can be improved.

The surface of the inorganic glass is treated as follows: A cleaned glass substrate is placed within a vacuum vessel, and the vessel is evacuated. The predetermined element or elements employed are ionized at an ion source and accelerated so that the entire surface or a partial area of the glass substrate can be irradiated with the accelerated ions to a predetermined implantation quantity.

When ion-irradiation is performed, the irradiated ions and a gas which includes carbon in a form such as CO and $CO_2$, both of which are present in the atmosphere, are reacted with each other so as to form excited carbon. This carbon is very reactive, so that it easily reacts with the glass components to form a film which includes carbon on the glass surface. This film is itself water repellent, and is firmly fixed to the glass substrate so that the water repellent film has excellent durability.

Further, in the case where the implanted element is a rare gas, it is possible to irradiate the glass substrate with ions such that the rare gas is introduced into the vacuum vessel at about $10^{-3}$ Torr and a predetermined bias voltage is applied to the glass substrate for glow discharge.

Further, on ordinary ion plating technique can also be employed. In this method, a substance is evaporated within a vacuum, and the evaporated substance is ionized in the gaseous phase by glow discharge or microwave discharge, and then the ionized substance is accelerated by a bias voltage toward the glass substrate for irradiation.

The kind of ions implanted in the glass to develop the above-mentioned characteristics is any one of or a combination of halogen elements (F, Cl, Br), metal elements (Al, Ti, Y, In, Bi) and Ce.

Alternatively, when the elements are ionized so as to have energy of 50 to 400 keV for ion-implantation to the glass surface, the water repellent glass surface layer can be improved.

The reason that a glass surface provided with water repellent characteristics can be formed is as follows: when halogen ions are implanted, the glass surface layer is transformed into halogenide; when the above-mentioned metallic ions are implanted the glass surface layer is transformed into metal oxide. Since the halogenides and oxides of the metals hereinabove mentioned are water repellent, it is possible to form a water repellent surface on the glass. Further, the bonding characteristics between the ion implantation layer and the glass surface is extremely excellent because no distinct interface exists between the layer and the glass surface. This arrangement is very different from the prior-art glass which has a film formed separately on the glass surface. Further, no peeling-off problem will arise because the ion implantation layer is formed integrally into the glass substrate.

When the metal elements other than those referred to in the above are ion-implanted, an oxide is formed or implanted ions are placed between lattices. Such oxides will not develop water repellent characteristics, and the presence of interstitial atoms will also not produce water repellent characteristics.

Further, when the implantation energy is less than 50 keV, the sputtering effect becomes dominant rather than the ion implantation effect, so that the glass surface layer suffers etching. When the ion implantation quantity is less than $1 \times 10^{17}$ ion/cm$^2$, the glass surface layer is not sufficiently halogenized nor oxidized, and above $1 \times 10^{20}$ ion/cm$^2$, implanted substances become excessive which causes problems associated with coloring and the like. When the ion implantation quantity is $1 \times 10^{17}$ ion/cm$^2$ or more, the durability can further be improved for certain elements.

The water repellent inorganic glasses of the present invention can be produced as follows: a glass substrate whose surface has been cleaned is arranged within a vacuum vessel and the vessel is evacuated. Then, the predetermined element or elements are ionized at an ion source, accelerated and implanted to a predetermined quantity in the entire surface of the glass substrate or a partial area thereof by a scanning method.

Further, in the case where implanted elements are solid at room temperature, a recoil implantation technique can be used. In this recoil implantation technique, the elements or the combined elements to be implanted are formed on the glass substrate in the form of film, and then high energy ions of 100 keV or more are collided against the surface to implant predetermined elements in the surface layer of the glass substrate on the basis of recoil action.

TABLE 1

International Periodic Table

| | 1 | | | | | | | | | | | | | | | | | Class A |
|---|---|---|---|---|---|---|---|---|---|---|---|---|---|---|---|---|---|---|
| | H | | | | | | | | | | | | | | | | | 0 |
| | 1.00794 | | | | | | | | | | | | | | | | | |
| | | | | | | | | | | | | | | | | | Class B | 2 He 4.00200 |
| A 1 | A 2 | | | | | | | | | | | | B 3 | B 4 | B 5 | B 6 | B 7 | |
| 3 Li 6.941 | 4 Be 9.01218 | Class D | | | | | | | | | | | 5 B 10.811 | 6 C 12.011 | 7 N 14.0067 | 8 O 15.9994 | 9 F 18.976103 | 10 Ne 20.179 |
| 11 Na 27.98977 | 12 Mg 24.305 | 3 | A 4 | A 5 | A 6 | A 7 | A 8 | | | 1 | B 2 | | 13 Al 26.90154 | 14 Si 28.0855 | 15 P 30.97376 | 16 S 32.066 | 17 Cl 35.453 | 18 Ar 39.948 |
| 19 K 39.0983 | 20 Ca 40.076 | 21 Sc 44.96591 | 22 Ti 47.65 | 23 V 60.9415 | 24 Cr 51.9901 | 25 Mn 54.9360 | 26 Fe 85.847 | 27 Co 56.9332 | 28 Ni 58.60 | 29 Cu 63.646 | 30 Zn 68.39 | | 31 Gn 69.723 | 32 Ge 72.59 | 33 As 74.9216 | 34 Se 78.96 | 35 Br 79.904 | 36 Kr 83.80 |
| 37 Rb 85.4678 | 38 Sr 87.62 | 39 Y 88.9059 | 40 Zr 91.224 | 41 Nb 92.9064 | 42 Mo 95.94 | 43 Tc (96) | 44 Ru 101.07 | 45 Rh 102.9056 | 46 Pd 100.42 | 47 Ag 107.8682 | 48 Cd 112.41 | | 49 In 144.82 | 50 Sn 118.710 | 51 Sb 121.75 | 52 Te 127.60 | 53 I 126.9045 | 54 Xe 131.29 |
| 55 Ca 132.9064 | 56 Ba 137.33 | 57-71 * | 72 Hf 178.49 | 73 Ta 160.9479 | 74 W 183.65 | 75 Re 160.207 | 76 Og 190.2 | 77 Ir 102.22 | 78 Pt 195.08 | 79 Au 190.9665 | 80 Hg 200.59 | | 81 Ti 204.383 | 82 Pb 201.2 | 83 Bi 208.9804 | 84 Po (209) | 85 At (210) | 86 Rn (222) |
| 87 Fr (223) | 88 Ra (226) | 89-103 ** | | | | | | | | | | | | | | | | |

*lanthanoids
**actinoids

| * | 57 La 138.9066 | 58 Ce 140.12 | 59 Pr 140.9077 | 60 Nd 144.24 | 61 Pm (1.45) | 62 Sm 160.36 | 63 Eu 151.96 | 64 Gd 157.25 | 65 Tb 168.9254 | 66 Dv 162.50 | 67 Ho 164.9304 | 68 Er 107.26 | 69 Tm 106.9342 | 70 Yb 173.04 | 71 Lu 170.967 |
|---|---|---|---|---|---|---|---|---|---|---|---|---|---|---|---|
| ** | 89 Ac (227) | 90 Th 232.0381 | 91 Pa (231) | 92 U 238.0289 | 93 Np (237) | 94 Pu (244) | 95 Am (243) | 96 Cm (247) | 97 Bk (247) | 98 Cf (251) | 99 Es (262) | 100 Em (257) | 101 Md (2358) | 102 No (259) | 103 Lr (260) |

Class E

The above embodiments of the present invention are further disclosed with respect to the preferred examples. (Examples)

Examples 1 to 4, Comparative examples 1 to 3 (in which ion irradiation quantities are different from the Examples), and Comparative example 4 (in which irradiated ions are different from the Examples) will be explained hereinbelow.

Examples 1 and Comparative examples 1

Soda lime glass was irradiated on one surface thereof with argon ions. The water repellent characteristics of the glass surface were evaluated by the measurement of the contact angle of water to the glass surface. Table 2 shows ion irradiation conditions and contact angles of water to the glass surface after ion irradiation. The contact angle of Comparative Example 1 whose ion irradiation quantity is outside the scope of the claims is also shown in Table 2 for comparison. Table 2 indicates that when soda lime glass was irradiated with argon ions within the range $5 \times 10^{14}$ to $1 \times 10^{17}$ ion/cm$^2$, the water contact angle was markedly increased, thus resulting in good water repellent characteristics. Further, the above characteristics were maintained even after a heat resistance test had been effected at 100 C. for 1 hour.

On the other hand, in Comparative Examples 1, if the ion irradiation quantity was less than $5 \times 10^{14}$ ion/cm$^2$, although the water contact angle increased a little as compared with a glass which was not irradiated, the water repellent characteristics were not satisfactory. For Ar ions, at an irradiation quantity above $1 \times 10^{17}$ ion/cm$^2$, Table 2 indicates that water contact angles did not change between before and after ion irradiation, and therefore resulted in no water repellence.

Examples 2

Soda lime was irradiated on one surface thereof with F ions. In the same way as in Examples 1, the water repellent characteristics were evaluated by the measurement of the contact angle of water to the glass surface. Table 3 shows ion irradiation conditions and contact angles of water to the glass surface after ion irradiation. Table 3 indicates that the glass surface irradiated with ions in a range of $5 \times 10^{14}$ to $1 \times 10^{17}$ ion/cm$^2$ had good water repellent characteristics. The similar effect was obtained in the case of Cl and Br ion irradiation. Further, the water repellent characteristics were maintained after a heat resistance test at 100 C. for 1 hour.

TABLE 3

SODA LIME GLASS IRRADIATED WITH F IONS

| | | IRRADIATION CONDITIONS | | CONTACT ANGLE AFTER IRRADIATION* | CONTACT ANGLE AFTER HEAT TREATMENT (100° C. × 1 hr) |
|---|---|---|---|---|---|
| | | QUA'TY (ION/cm$^2$) | ENERGY (keV) | | |
| EXAMPLES 2 | 1 | $1 \times 10^{15}$ | 50 | 80° | 80° |
| | 2 | $1 \times 10^{16}$ | 50 | 85° | 85° |
| | 3 | $6 \times 10^{16}$ | 50 | 88° | 88° |
| | 4 | $1 \times 10^{17}$ | 50 | 90° | 90° |

*BEFORE IRRADIATION: 15°

Examples 3 and Comparative Examples 3

Quartz glass was irradiated with Li or Na ions on one surface thereof. In the same way as in Examples 1, the water repellent characteristics were evaluated on the basis of contact angle of water to the glass surface after ion irradiation. Table 4 shows the ion employed, irradiation conditions, water contact angle to the glass surface after ion irradiation, water contact angle after heat treatment (at 100 C. for 1 hr). Simultaneously, Table 4 shows comparative Examples 3 in which the glass was irradiated with Li or Na ions at a dose of $2 \times 10^{17}$ and $1 \times 10^{14}$ ion/cm$^2$.

Table 4 indicates that when quartz glass was irradiated with Li or Na ions of the claimed dose, the water contact angle increased and water repellent characteristics were good. Further, the water repellent characteristics were maintained even after a heat resistance test of 100 C. for 1 hr.

TABLE 2

SODA LIME GLASS IRRADIATED WITH Ar IONS

| | | IRRADIATION CONDITIONS | | CONTACT ANGLE AFTER IRRADIATION* | CONTACT ANGLE AFTER HEAT TREATMENT (100° C. × 1 hr) |
|---|---|---|---|---|---|
| | | QUA'TY (ION/cm$^2$) | ENERGY (keV) | | |
| EXAMPLES 1 | 1 | $5 \times 10^{14}$ | 50 | 70° | 70° |
| | 2 | $2 \times 10^{15}$ | 50 | 76° | 75° |
| | 3 | $1 \times 10^{16}$ | 50 | 77° | 77° |
| | 4 | $5 \times 10^{16}$ | 50 | 78° | 78° |
| | 5 | $1 \times 10^{15}$ | 100 | 80° | 80° |
| | 6 | $1 \times 10^{16}$ | 100 | 85° | 80° |
| COMPARISONS 1 | 1 | $1 \times 10^{14}$ | 50 | 40° | — |
| | 2 | $2 \times 10^{17}$ | 50 | 50° | — |
| | 3 | $1 \times 10^{13}$ | 50 | 25° | — |
| | 4 | $2 \times 10^{17}$ | 20 | 10° | — |
| | 5 | $2 \times 10^{17}$ | 100 | 20° | — |

*BEFORE IRRADIATION: 15°

The same effect was obtained when alkali metals and alkaline earth metals such as K, Cs, Ca, Mg, etc. were used.

On the other hand, the Comparative Examples 3 for Li and Na illustrate that when an ion irradiation quantity less than $5 \times 10^{14}$ ion/cm$^2$ or greater than $1 \times 10^{17}$ ion/cm$^2$ was employed, the water contact angle did not change or decreased after ion irradiation, so that the water repellent characteristics were poor.

angle lies between 20 and 70 degrees, the surface conditions become a transient state between water repellent and hydrophilic, so that the visibility is poor when water drops are stuck onto the glass surface. In the case of the Comparative Examples 4, the contact angle lies within this transient range, thus the water repellent characteristics are not preferred. In addition, after the heat resistance test at 100 C., the contact angle decreased markedly, thus indicating that the water repel-

TABLE 4

QUARTZ GLASS IRRADIATED WITH Li OR Na IONS

|  |  |  | IRRADIATION CONDITIONS | | CONTACT ANGLE AFTER IRRADIATION* | CONTACT ANGLE AFTER HEAT TREATMENT (100° C. × 1 hr) |
|---|---|---|---|---|---|---|
|  |  | ION | QUA'TY (ION/cm$^2$) | ENERGY (keV) |  |  |
| EXAMPLES 3 | 1 | Li | $1 \times 10^{15}$ | 50 | 75° | 75° |
|  | 2 | Li | $1 \times 10^{16}$ | 50 | 80° | 80° |
|  | 3 | Na | $1 \times 10^{15}$ | 50 | 78° | 78° |
|  | 4 | Na | $1 \times 10^{16}$ | 50 | 82° | 82° |
| COMPARISONS 3 | 5 | Li | $2 \times 10^{17}$ | 50 | 20° | — |
|  | 6 | Na | $2 \times 10^{17}$ | 50 | 25° | — |
|  | 7 | Li | $1 \times 10^{14}$ | 50 | 45° | — |
|  | 8 | Na | $1 \times 10^{14}$ | 50 | 43° | — |

*BEFORE IRRADIATION: 40° lence had poor durability.

TABLE 5

SODA LIME GLASS IRRADIATED WITH Ti, Al, Zn, Sn, Si, B, N OR Ni IONS

|  |  | IRRADIATION CONDITIONS | | | CONTACT ANGLE AFTER IRRADIATION* | CONTACT ANGLE AFTER HEAT TREATMENT (100° C. × 1 hr) |
|---|---|---|---|---|---|---|
|  |  | KIND OF ION | QUA'TY (ION/cm$^2$) | ENERGY (keV) |  |  |
| EXAMPLES 4 | 1 | Ti | $1 \times 10^{15}$ | 50 | 80° | 80° |
|  | 2 | Al | $1 \times 10^{15}$ | 50 | 79° | 79° |
|  | 3 | Al | $1 \times 10^{16}$ | 50 | 81° | 81° |
|  | 4 | Zn | $1 \times 10^{15}$ | 50 | 80° | 80° |
|  | 5 | Zn | $1 \times 10^{16}$ | 50 | 83° | 83° |
|  | 6 | Sn | $1 \times 10^{15}$ | 50 | 80° | 80° |
| COMPARISONS 4 | 7 | Si | $1 \times 10^{15}$ | 50 | 73° | 65° |
|  | 8 | B | $1 \times 10^{15}$ | 50 | 70° | 55° |
|  | 9 | N | $1 \times 10^{15}$ | 50 | 75° | 60° |
|  | 10 | Ni | $1 \times 10^{15}$ | 50 | 77° | 65° |

*BEFORE IRRADIATION: 15°

Examples 4 and Comparative Examples 4

Soda lime glass was irradiated on one surface thereof with an ion selected from Ti, Al, Zn and Sn. Table 5 shows the ion employed, irradiation conditions, contact angle of water to the glass surface after ion irradiation, and the contact angle after heat treatment (100 C. for 1 hr). Simultaneously, Table 5 shows Comparative Examples 4 in which glass was irradiated with ions which are outside of the scope of the present invention.

Table 5 indicates that when soda lime glass was irradiated with Ti, Al, Zn, or Sn ions, the water contact angle increased markedly, thus resulting in good water repellent characteristics. Further, the water repellent characteristics did not change after heat resistance test of 100 C. for 1 hr. The similar effect was obtained when the glass was irradiated with metal element ions of groups 3A, 4A, 1B, 2B, 3B, 4B and 5B.

On the other hand, in Comparative Examples 4 in which the glass was irradiated with ions of semiconductor elements such as Si or N or Group 8 elements, the water repellent characteristics were inferior to those in which ions of elements belonging to class D in Table 1 defined in the claims were irradiated. If the contact Examples 5 and Examples 6 of water repellent inorganic glass according to the present invention will be described hereinbelow in comparison with Comparative Examples in which an organosilicone based water repelling agent is applied. The water repellent characteristics were evaluated by the measurement of the contact angle of water to the glass surface. In addition, changes in water repellence due to cloth wiping test, heat resistance test (100 C. x 1 hr) and 100 - hr wiper test were also shown with respect to Examples 5 and Comparative Example 5.

Examples 5

Quartz glass was irradiated and implanted, or implanted, on one surface thereof with F ions. Cleaned quartz glass was put in a vacuum vessel; the vessel was evacuated to $1 \times 16^{-6}$ Torr; and fluorine ions were implanted under the conditions shown in Table 6. The water repellent characteristics on the glass surface were evaluated by measurement of the water contact angle.

No color change was recognized after irradiation or implantation.

TABLE 6

ION IMPLANTATION (IRRADIATION) CONDITIONS AND WATER CONTACT ANGLE AFTER IMPLANTATION (IRRADIATION) IN EXAMPLES 5

| EXAMPLES 5 | IMPLANTATION CONDITIONS (IRRADIATION) | | WATER CONTACT ANGLE* |
|---|---|---|---|
| | ENERGY (keV) | QUAN'TY (ION/cm$^2$) | |
| 1 | 50 | $1 \times 10^{17}$ | 90° |
| 2 | 50 | $5 \times 10^{17}$ | 85° |
| 3 | 100 | $1 \times 10^{18}$ | 80° |

*BEFORE IRRADIATION: 40°

Table 6 indicates that the water contact angle to the glass surface to which ions were irradiated and implanted, or implanted, increased markedly, and good water repellent characteristics were obtained.

To check the durability of the water repellence, a cloth wiping test, a heat resistance test (100 C., 1 hr), and a wiper test (100 hr) were performed. Table 7 shows the test results together with that associated with the Comparative Example in which an organosilicone based water repelling agent was applied.

TABLE 7

CHANGE IN WATER REPELLENCE AFTER DURABILITY TESTS IN EXAMPLES 1 AND COMPARATIVE EXAMPLE

| SAMPLE | DURABILITY TESTS | | |
|---|---|---|---|
| | CLOTH WIPING | HEAT TREATMENT (100° C. × 1 hr) | WIPER TEST |
| EXAMPLE 5 1 | O | O | O |
| EXAMPLE 5 2 | O | O | O |
| EXAMPLE 5 3 | O | O | O |
| COMPARISON | O | X | Δ |

O: NO WATER REPELLENCE CHANGE
Δ: LITTLE WATER REPELLENCE
X: NO WATER REPELLENCE

Table 7 indicates that Examples 5 have sufficient durability in water repellence effect. The same results were obtained when Cl or Br ions were irradiated and implanted, or implanted.

One surface of a soda lime glass was irradiated and implanted with an ion selected from Al, Ti, In and Bi. Table 8 shows the ion employed, irradiation implantation conditions, and water contact angle (before irradiation and implantation: 15°) after ion irradiation and implantation. No color change was recognized after ion irradiation and implantation.

TABLE 8

ION IMPLANTATION (IRRADIATION) CONDITION AND WATER CONTACT ANGLE AFTER IMPLANTATION (IRRADIATION) IN EXAMPLE 6

| EXAMPLE 6 | KIND OF ION | IRRADIATION CONDITIONS | | CONTACT ANGLE AFTER IRRADIATION* (°C.) |
|---|---|---|---|---|
| | | ENERGY (keV) | QUA'TY (ION/cm$^2$) | |
| 1 | Al | 50 | $1 \times 10^{17}$ | 73° |
| 2 | Ti | 50 | $1 \times 10^{17}$ | 80° |
| 3 | In | 50 | $1 \times 10^{17}$ | 80° |

TABLE 8-continued

ION IMPLANTATION (IRRADIATION) CONDITION AND WATER CONTACT ANGLE AFTER IMPLANTATION (IRRADIATION) IN EXAMPLE 6

| EXAMPLE 6 | KIND OF ION | IRRADIATION CONDITIONS | | CONTACT ANGLE AFTER IRRADIATION* (°C.) |
|---|---|---|---|---|
| | | ENERGY (keV) | QUA'TY (ION/cm$^2$) | |
| 4 | Bi | 50 | $1 \times 10^{17}$ | 84° |

*BEFORE IRRADIATION: 15°

Table 8 indicates that the contact angle on the glass surface obtained by irradiation and implantation of ions of Al, Ti, In or Bi under 50 keV and $1 \times 10^{17}$ ion/cm$^2$ increased markedly, thus resulting in good water repellent characteristics.

In this case, when ion-implanting (irradiating) energy was further increased, only the depth of an ion implantation layer was increased and the surface water repellence did not increase. Further, even when the ion implantation quantity was further increased, since the surface composition had already been changed to a constant level, the water repellence did not change.

Figure 2:
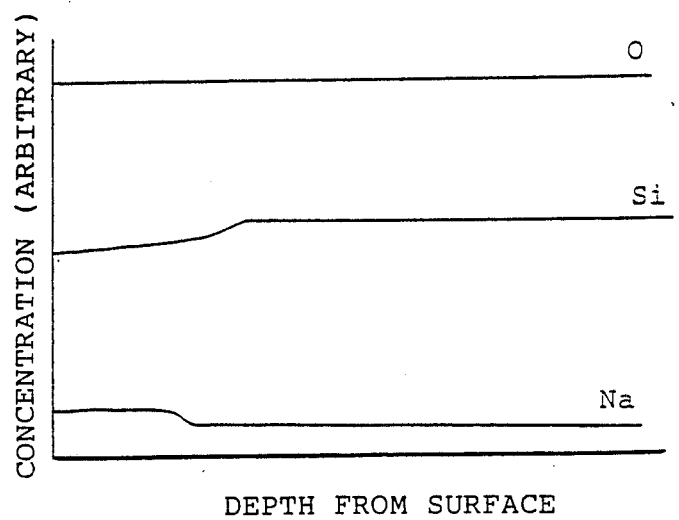
FIG. 2 is a composition distribution graph along the depth starting from the surface of soda lime glass in the same Example before Al ions are implanted.

FIG. 1 is a graph showing change in composition along the depth from the surface of Example 6-1 shown in Table 8 (Al ions were implanted in soda lime glass), which was measured by IMMA. FIG. 2 is a similar graph showing change in composition of non-treated soda lime glass (no ions were implanted). A comparison of FIGS. 1 and 2 indicate that the implanted Al ions exist in the surface layer and are mixed with the inner glass components (Na, Si) at the boundary portion, and further the surface layer provided with water repellent characteristics is firmly bonded to the glass substrate.

Further, in the case of glass including alkali or alkaline earth metals, such as soda lime glass, although these elements are usually abundant in the surface layer, once ions are implanted, alkali or alkaline earth metals are readily dislocated, so that ion substances may readily enter there.

The same good results as same as in Examples 5 were obtained with respect to the durability of the water repellent effect of the Examples 6. Further, glass to which Y or Ce ions were implanted had the same characteristics.

What is claimed is:

1. A transparent, inorganic glass comprising an inorganic oxide and having high water repellence which has been produced by irradiating ions having an energy of 50 to 100 keV upon a surface of said inorganic glass in the presence of a gas containing carbon so as to form a water repellent film containing carbon on the surface such that the contact angle of water on the surface of the glass is at least 70 degrees, said ions are those of at least one element selected from the group consisting of F, Cl, Br, Al, Ti, Y, In and Bi, He, Ne, Ar, Kr, Xe, Sc, Cu, Zn, Zr, Ag, Cd, Sn, Sb, Au, Hg, Tl, Pb, Li, Na, K, Rb, Cs, Be, Mg, Ca, Sr, and Ba, with the dose of said ions being $5 \times 10^{14}$ to $1 \times 10^{17}$ ion/cm$^2$.

2. A transparent inorganic glass according to claim 1, wherein said ions are ions of one of F, Cl and Br ions and the dose of said ions is $1 \times 10^{15}$ to $1 \times 10^{17}$ ion/cm$^2$.

3. A transparent inorganic glass according to claim 1, wherein said ions are Ar ions and the dose of said ions is $1 \times 10^{15}$ to $1 \times 10^{17}$ ion/cm$^2$.

4. A transparent inorganic glass according to claim 1 wherein the inorganic glass includes alkali or alkaline earth metals.

5. A transparent inorganic glass according to claim 1 wherein the inorganic glass comprises soda-lime glass, borosilicate glass, or silica glass.

6. A transparent inorganic glass according to claim 1 wherein the contact angle of water on the surface of the glass is from 70 to 95 degrees.

* * * * *